United States Patent
Krass

[15] 3,641,686
[45] Feb. 15, 1972

[54] EDUCATIONAL TESTING MACHINE
[72] Inventor: Alvin Krass, Holmdel, N.J.
[73] Assignee: Key Education Inc., Red Bank, N.J.
[22] Filed: Apr. 22, 1970
[21] Appl. No.: 30,914

[52] U.S. Cl. .........................................................35/22 R
[51] Int. Cl. .....................................................G09b 19/00
[58] Field of Search .....................35/22 R; 273/1 E; 272/68; 73/379, 380

[56] References Cited

UNITED STATES PATENTS 1,494,986   5/1924   Behm...............................35/22 R X
3,426,450   2/1969   Isenhour...........................35/22 R
3,442,132   5/1969   De Mare..........................73/379 R

*Primary Examiner*—William H. Grieb
*Attorney*—Harry E. Westlake, Jr.

[57] ABSTRACT

A unitary compact portable teaching instrument for psychology, providing for a number of distinct tests, specifically (1) a learning ability testing unit on which the speed with which a preset sequence of consecutive switches can be learned, (2) a reaction time tester and (3) a manual pressure measuring device, has been developed.

5 Claims, 1 Drawing Figure

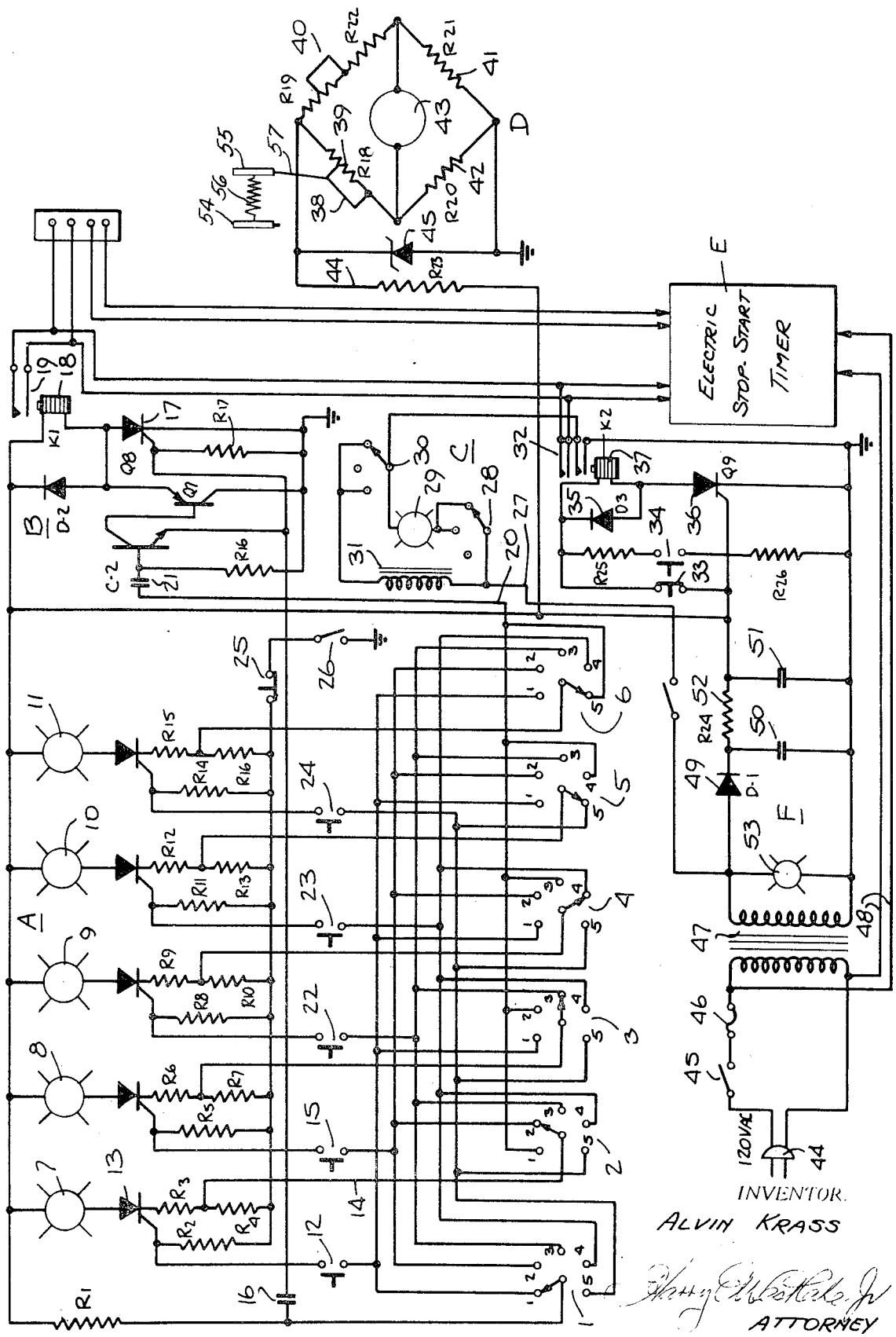

EDUCATIONAL TESTING MACHINE

This invention relates to a compact portable instrument classroom for psychological instruction. More specifically, it relates to a compact portable unitary tabletop instrument by means of which a variety of psychological tests can be run in a classroom, an instrument simple to operate and containing, within the one unit, a number of testing methods heretofore unavailable except in the form of multiple and expensive separate machines.

In the past, in psychological instruction in lower school levels, a teacher has had to have at his disposal a variety of separate units, many of which were expensive. A teacher trying to instruct a class in how people could vary in their ability to learn, in how people varied in the time they reacted and how various psychological factors effected such reaction time, in how variations in size, sex, etc., affected these and other physiological characteristics, etc., had to have at his disposal a variety of instruments, lights, timers, gauges, etc. To purchase this conglomeration of tools cost money. To store them used up more space than the average ordinary school classroom or science locker had available. Needed training in psychology and its sociological consequences therefore became a luxury usually passed up by the ordinary board of education.

I have devised an instrument which presents in one economical package a unitary compact machine by which measurements of such physiological or psychological factors as time to learn and reaction time can be made and from which the class can learn how these are affected by differences in sex, size, race, etc. This invention makes a variety of such tests available compactly and economically and thus permits psychological instruction where such was never before economically feasible. There is no need for the school to buy and store a variety of expensive and complex instruments, for a group of such is provided in one unitary package, and provision can be made to attach further similar units of groups of other testing instruments, as later needs develops.

This invention can be better understood with reference to the drawing in which:

FIG. 1 is a schematic wiring diagram of a complete embodiment of the invention.

In FIG. 1 the circuitry area marked A shows the wiring for a learning ability testing unit acting through switching circuitry B on an electric stop-start-reset timer E of any standard compact design. Circuitry area C shows the wiring for a reaction time tester also connected to the timer E. The circuitry area D shows the wiring for a pressure measuring device which converts the motion of a moving lever into an electric measurement. The power supply circuitry for the machine is shown in area F.

In the learning ability testing circuitry A, there are a series of multiple switches 1, 2, 3, 4, 5 and 6 which act as a setting mechanism to set the rest of the circuitry for operation in any desired sequence. The rest of the circuitry consists of five indicator lights 7, 8, 9, 10 and 11 and wiring connecting with switches 1, 2, 3, 4, 5 and 6 in such a manner that all are interconnected and will operate in any sequence preset in said switches 1, 2, 3, 4, 5 and 6. Resistors $R_4$, $R_7$, $R_{10}$, $R_{13}$ and $R_{16}$ are all 15 ohms. Resistors $R_2$, $R_5$, $R_8$, $R_{11}$ and $R_{14}$ are all 1,000 ohms. Resistors $R_3$, $R_6$, $R_9$, $R_{12}$ and $R_{15}$ are all 15 ohms. Resistor $R_1$ is 1,500 ohms.

Switches 1, 2, 3, 4, 5 and 6 are shown as set in that sequence and will be so described. Positive voltage of about 17 volts is delivered to the common pole of switch 1. The connection being to pole 1, the power is thus delivered to a single pole make-break switch 12. When switch 12 is closed, power passes up through the silicon controlled rectifier 13 to light 7. At the same time, power passes through line 14 to the common pole of switch 2. The same sequence occurs when switch 15 is closed, lighting light 8 and supplying power to the common pole of switch 3, and so on until light 11 is lit and power has been delivered to switch 6. The first closing of switch 12 sends a pulse through condenser 16 which acts through rectifier 17 to actuate relay 18 to close switch 19 and start timer E.

The final delivery of power to switch 6 sends power through line 20 and condenser 21 to produce the pulse causing relay 18 to open switch 19 and stop timer E. In the switch mechanism resistor 16 and 17 are both 470 ohms, while capacitor C-2 is 1 microfarad.

As shown, starting switch 1 can be set to activate any one of the five lights 7, 8, 9, 10 and 11 and each in turn will deliver power to its respective switch 2, 3, 4, 5 and 6. These in turn can be set to deliver power to any one of the remaining switches. Switch 12 is the starting switch. It is necessary to discover which of the switches 15, 22, 23, 24 and 25 must be closed next and in what order the rest must be closed. Switch 26, to ground, is the reset switch, turning off this testing device.

Variations possible in this circuitry will be obvious to those skilled in the art. The number of units needed to be actuated in sequence can be varied. The lights can be eliminated, forcing the person being tested to learn by trial and error the whole sequence before stopping the clock or activating some sort of other indicator that the sequence is finished. Switches 1, 2, 3, 4, 5 and 6 are usually placed physically in such a way that they can be covered and the presetting is not readily visible. E.g., they can be placed in a recess in the end of the machine's container and a cover provided.

In the reaction time circuitry of area C, the current is fed through line 27 and switch 28 to indicator light 29 and thence to switch 30. It is also fed through buzzer 31 to two of the three-multiple poles of switch 30. Switch 28 also is fitted with three multiple poles, only two of which connect to light 29. Thus switches 28 and 30 have three possible settings one for the audible signal only (buzzer 31) when both are set for the left-hand pole, one for the visible signal only (light 29) when both are set on the middle pole and one for both indicators, when both switches are on the right-hand pole. The current leads from switch 30 to the timer switch 32. The reaction time mechanism consists of a starting switch 33 and a stopping switch 34, both connected through silicon controlled rectifiers 35 and 36 to relay 37. In this circuit resistor $R_{25}$ is 390 ohms and $R_{26}$ is 1,000 ohms. Switch 33 starts the timer E by actuating relay 37 which closes switch 32. Switch 34 stops the timer E by opening switch 32, thus giving an indication of how fast the subject reacts.

Again variations will be obvious to those skilled in the art. Either light 29 or buzzer 31 can be eliminated, modifying the need for switches 28 and 30. Other variations in the circuitry C will be equally obvious.

In the pressure measuring means shown in area D of FIG. 1, a mechanical mechanism, comprising a pair of apposable levers 54 and 55, lever 54 being optionally fixed and lever 55 being connected to lever 54 by a compression means 56, such as a spring, and also to movable contact 38 by mechanical means 57 on a resistance 39 which is in one side of a modified Wheatstone bridge and which varies from 5,000 to 7,500 ohms. Another leg of said bridge has an adjustable resistance 40 which is a maximum of 2,200 ohms. Other legs of the Wheatstone bridge have fixed resistances 41 (1,500 ohms) and 42 (560 ohms). Across the center of the bridge is connected ammeter 43 which measures any flow causes by motion of contact 38 on resistance 39. Adjustable resistance 40 is used to set the ammeter to zero at the start. Power is fed to the bridge through line 44 (through 150 ohm resistor $R_{25}$) to the top of the bridge and through a silicon controlled rectifier 45 (to control voltage) to the bottom of the bridge. The line between rectifier 45 and the bridge is grounded.

This testing means operates by measuring the extent to which each subject can compress the levers and move adjustable contact 38, as reflected in the ammeter 43. The more pressure which can be applied, the more current is read on ammeter 43. Other possible methods of testing this property will be readily apparent to those skilled in the art.

The power supply to the unit is described by the circuitry of area F. Standard AC current is supplied through plug 44, on-off switch 45 and fuse 46 to transformer 47. AC current for the timer E is drawn off before the transformer through lines 48. Transformer 47 changes the current to 17 volts DC through rectifier 49, condensers 50 and 51 and resistance 52 ($R_{24}$, 5 ohms). An on-off indicator light 53 is convenient but not necessary.

The instrument thus described is mounted in a single container, such as a metal box, with the various switches, indicator lights, pressure levers, timer indicator and ammeter all mounted on the outside of the container, for ready observation. The whole constitutes a compact unitary portable entity easily stored and transported and above all, available quite cheap compared with the sum total of individual units—reaction time tester, timing mechanism, learning ability tester, etc., which must otherwise be bought to do the same job.

In the use of this device, the physical measurements such as learn ability are run on a variety of subjects and psychological pedagogueical methods are applied to use these measurements for the teaching of psychology. This invention however is not concerned with these methods but with the uniquely compact unitary portable instrument which brings such instruction within the exchequer of the average school and provides the necessary instrumentation in an easily stored unit which can readily be taken from one classroom to the next.

What is claimed is:

1. A machine for educational psychological training comprising, in combination
   a. a source for low voltage direct current;
   b. an electrically actuated start and stop timer;
   c. a learning time testing means connected from said power source to said timer through electrical means for starting and stopping said timer, said learning means comprising a first and second sets of multiple switching means, each of said first switching means being electrically connected through one of said second set of multiple switching means so that the said second set of switching means must be operated in the sequence preset in the said first switching means to start and stop said timer when all said second switching means have been actuated in the said present sequence, each said first switching means having electrical means for connecting it to each of the individual switching means in said second set of switching means in such a way that the closing in proper sequence of one of said second switching means activates the next preset sequence through one of said first set of switching means, the first of said preset sequence of said second switching means actuating a relay to close an electrical connection to start said timer and the last in said preset sequence actuating said relay to open said connection and stop said timer;
   d. a reaction time tester connected from said power source to said timer and comprising an initiating switching means electrically starting said timer and a terminating means electrically stopping said timer; and
   e. a pressure measuring means connected to said power source, comprising a mechanical means for applying pressure between two levers, at least one of which is movable, coupled by mechanical means for changing the electrical characteristics of an electric circuit and means for measuring said change in electrical characteristics;

said whole machine being constructed as a compact unitary portable entity.

2. The machine of claim 1 in which said timer is also provided with means for electrical actuation from external sources.

3. The machine of claim 1 in which the said second set of multiple switching means in said learning time testing means has a corresponding set of indicator means electrically connected to each said individual switching means such that it is only actuated when said switching means is actuated in said preset sequence.

4. The device of claim 1 in which said reaction timing device has audible and visible means individually or together connectable to said initiating and terminating switching means so as to be actuated during the time between the starting and the stopping of the said timing device.

5. The device of claim 1 in which the said pressure measuring device comprises a modified Wheatstone bridge circuit having an adjustable resistance on one leg and a variable resistance in another leg mechanically connected to said means for applying varying pressure between two levers such that increase in pressure alters said resistance and causes a current to flow and be measured by an indicating means across said bridge.

* * * * *